Jan. 14, 1964　　　　　　G. PEREZ　　　　　　3,118,054
RECORD SENSING APPARATUS
Filed Dec. 27, 1961
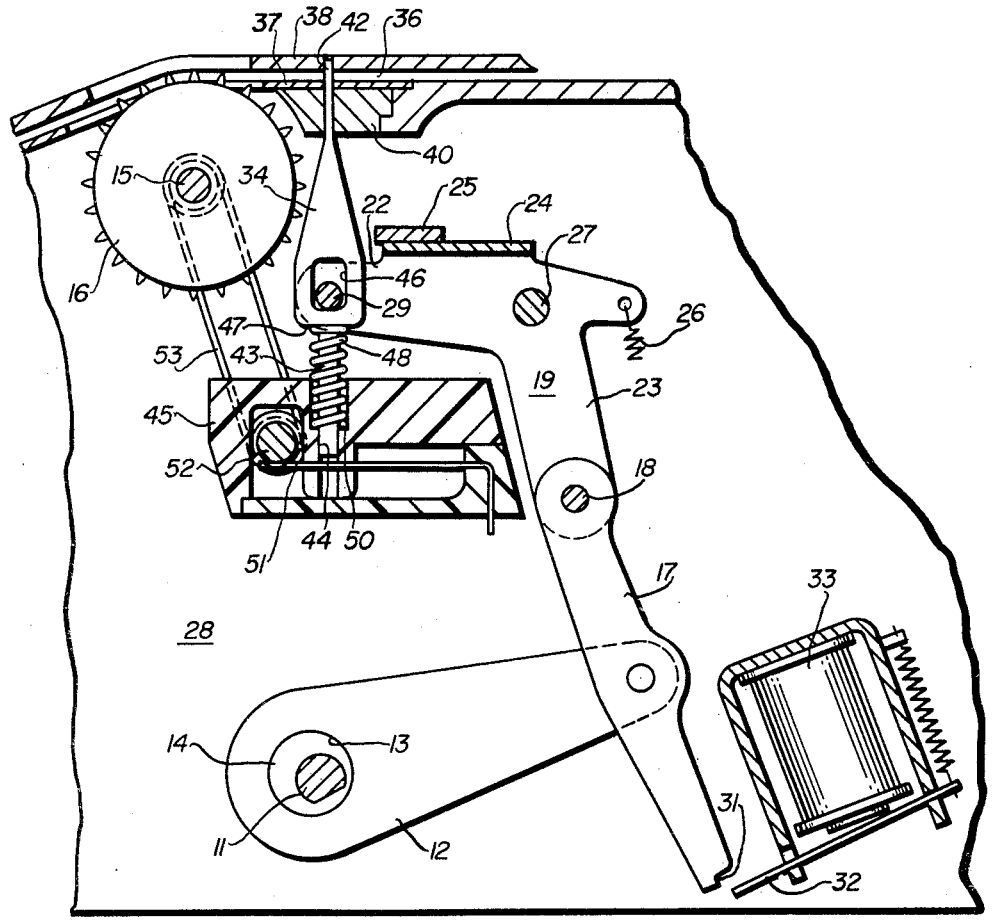
INVENTOR
GUILLERMO PEREZ
BY Thomas S. Ross
Joseph R. Spalla
ATTORNEYS 3,118,054
RECORD SENSING APPARATUS
Guillermo Perez, Bristol, Conn., assignor to Royal McBee Corporation, New York, N.Y., a corporation of New York
Filed Dec. 27, 1961, Ser. No. 162,445
5 Claims. (Cl. 235—61.11)

This invention relates to record sensing apparatus; more particularly it relates to record sensing apparatus of the type characterized by mechanically operated record sensing pins and by a free running drive source, and specifically it relates to novel means for engaging said source to effect the retraction of the record sensing pins from a record being sensed to permit movement of the record.

In record sensing devices presently known record sensing pins are retracted during a cycle of a shaft which is intermittently coupled as by a solenoid actuated clutch to a continuously driven motive source. Such an organization requires a multiplicity of relatively high inertia elements which are not only costly but more importantly militate against compact constructions and reliable high speed operation.

In accordance with the present invention there is provided a continuously driven shaft which through an eccentric oscillates an arm which in turn causes the oscillation of a link pivotally mounted on a pin retracting crank member. The interposition of a member into the path of the oscillating link causes it to pivot about the point of interposition rather than the point of connection to the crank member thereby causing the crank member to rotate about its own pivot and thereby effect the retraction of the sensing pins.

An object of the invention is to provide a record sensing apparatus of compact construction and which is reliably operable at high speeds.

Another object of the invention is to provide apparatus for effecting the engagement of record sensing pin retracting mechanism with a continuously driven motive source.

Still another object of the invention is in the provision of a solenoid operated interposer operable to effect the transmission of power from a continuously driven motive source to a record sensing pin retracting mechanism.

Other objects and many of the attendant advantages of this invention will be readily appreciated as the same becomes better understood by reference to the following detailed description when considered in connection with the accompanying drawing wherein:

The single FIGURE of the drawings is an elevational view of record sensing apparatus in accordance with the invention.

Referring now to the single figure of the drawing there is shown a shaft 11 adapted to be continuously driven from a suitable motive source (not shown). A drive arm 12 is provided with a circular cutout 13 adjacent one end in order to receive a circular cam 14 eccentrically mounted on shaft 11 whereby for each rotary cycle of shaft 11, arm 12 will be oscillated in a substantially lateral direction. The shaft 11 also carries a similar cam and drive arm associated with tape feed mechanism (not shown) whereby the shaft 15 of a tape feed sprocket 16 may be incrementally rotated in timed relation to a sensing operation. The tape feed mechanism is preferably that disclosed and claimed in applicant's copending application Serial No. 36,531, now Patent No. 3,036,474.

The free end of the drive arm 12 is articulately connected to and between the ends of a substantially vertically oriented link 17, the upper end of which is articulately connected to a cross shaft 18 associated with a control element generally designated by reference numeral 19. The control element comprises spaced angle arms each having a lateral leg 22 extending toward the left as viewed in the figure and a leg 23 angularly depending therefrom toward the right. The angle arms are connected in spaced relation by a cross piece 24 which is secured to or integrally formed with the upper edges of the laterally extending legs 22. The cross piece 24 normally abuts a clockwise motion limiting stop 25 under the influence of a return spring 26 and springs associated with sensing pins as will hereinafter appear. The vertices of the angle arms are pivoted on a cross shaft 27 secured to the machine frame 28. The extremities of the lateral and depending legs carry the cross shaft 29 and the cross shaft 18 respectively. As stated before the link 17 is articulately connected to cross shaft 18 and normally oscillates about shaft 18 in response to the oscillating drive arm 12. The lower free extremity of the lever arm 17 is provided with a notch 31 which is adapted to be engaged by an interposer comprising the armature 32 of a pin retracting solenoid 33. Upon energization of the solenoid the armature 32 will be interposed in the path of link 17 during the initial oscillating stroke of the drive arm 12 and will engage the notch 31 therein; continued movement of the link by drive arm will cause the link 17 to pivot about the notch 31 and thereby cause the control element 19 to rotate counterclockwise about pivot shaft 27.

As seen in the figure data sensing pins 34 of suitable light weight plastic material are supported for vertical movement into and out of a record channel 36 defined by a horizontally disposed die plate 37 and a spaced horizontally disposed record hold down plate 38 which is pivotally mounted for counterclockwise movement away from die plate 37. The upper extremities 42 of the pins, which have a restricted diameter to permit their movement into perforation patterns in a record moving through the channel 36, are guidingly received in holes in a frame supported block 40 to which the die plate is secured; the column of holes in the die plate being aligned with the holes in the guide block. The lower extremity 43 of each sensing pin, which is of larger diameter than its upper extremity is guidingly received in a hole 44 in an insulating block 45 secured to the machine frame 28. The intermediate portions of the sensing pins are relatively larger than the extremities and are provided with slots 46 whereby the pins may be mounted about and for movement relative to the cross shaft 29 secured between the control element legs 22 and whereby the cross shaft 29 may move relative to pins held retracted by a record. The relatively wider intermediate portions of the pins form annular shoulders 47 adapted to be engaged by the upper ends of coiled springs 48 surrounding the lower extremities 43 of the pins. The lower ends of the springs 48 are supported by annular shoulders 50 formed in the insulating block by the enlargement of the uppermost portion of the guide holes 44 in the insulating block. The normal lengths of the springs 48 are such that the pins are biased against the cross shaft 29 and into the record channel 36 as shown in the figure, which is the normal sensing position. In order to feed a record the pins must be retracted and this occurs upon counterclockwise rotation of the control element 19 under the action of link 17 when the solenoid 33 is energized. When the pins are retracted to permit movement of a record their lower extremities are adapted to engage and depress associated spring contacts 51 and cause them to break contact with a common roller contact 52 which is mounted for rotation in the insulating block and driven by a belt connection 53 to the record feed sprocket shaft 15 whereby it is incrementally rotated to present a new contact surface after each sensing operation.

During the interval the pins are retracted the record will be fed columnwise by the tape feed mechanism to present the next perforation pattern in the record opposite the sensing pins. Toward the end of the feed interval with the arm 12 moving leftwardly away from interposer 32 the pins are released for movement by associated springs such that those pins opposite imperforate areas will be prevented from rising by the imperforate areas in the record to an extent such that their associated contacts will not "make." The force of the springs 48 associated with pins opposite perforations act in concert with the force of spring 26 to return the control element 19 to its normal position through engagement of the lower boundary of the slots 46 with the cross shaft 29. The force of the springs associated with pins opposite imperforate areas coupled with the low mass of the pins is not sufficient however to perforate or tear the record.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. Record processing apparatus comprising
a record sensing element,
means normally biasing said element against a record to sense for the presence or absence of a perforation therein,
crank means for moving said element away from said record to permit movement of said record,
means for operating said crank means comprising a lever pivotally connected at one end to said crank means,
cyclically operable means for continuously oscillating said lever about said pivotal connection, and
interposer means adapted to be moved into the path of movement of the other end of said lever so as to permit said lever to pivot about said other end and thereby oscillate said pivotal connection whereby said crank means is operated.

2. Record processing apparatus comprising,
a plurality of record sensing elements,
means normally biasing each of said elements into a record channel to sense for the presence or absence of perforations in a record passing therethrough,
crank means operable to move all of said elements out of said record channel,
means for operating said crank means comprising a lever articulately connected to said crank means and continuously oscillatable about said connection,
and means operable into the path of said lever to provide a pivot point for said lever removed from said connection whereby the oscillation of said lever about said pivot point moves said connection and crank means.

3. Apparatus as recited in claim 2 further comprising means responsive to the positions of said elements for indicating the presence or absence of perforations comprising a common contact and a flexible contact associated with each of said elements and operable thereby into and out of contact with said common contact.

4. Record reading apparatus comprising
a record sensing element,
means normally biasing said element against a record to sense for the presence or absence of a perforation therein,
a bell crank for moving said element away from said record to permit movement of said record,
means for operating said bell crank comprising a lever pivotally connected at one end to said bell crank,
cyclically operable means for continuously oscillating said lever about said pivotal connection,
and solenoid operated interposer means adapted to be moved into the path of movement of the other end of said lever so as to permit said lever to pivot about said other end and thereby oscillate said pivotal connection whereby said bell crank is operated.

5. Apparatus as recited in claim 4 further comprising a record feed sprocket adapted to be indexed during intervals said elements are retracted,
a rotatably mounted common contact,
means coupling the shaft of said sprocket to said common contact whereby the latter is simultaneously indexed, and a contact associated with each of said elements and operable thereby into and out of contact with said common contact.

References Cited in the file of this patent
UNITED STATES PATENTS

| | | |
|---|---|---|
| 1,298,440 | Benjamin | Mar. 25, 1919 |
| 1,910,586 | Bartholomew et al. | May 23, 1933 |